United States Patent [19]

Jolley et al.

[11] Patent Number: 5,158,698

[45] Date of Patent: * Oct. 27, 1992

[54] LIQUID COMPOSITIONS CONTAINING THIOCARBAMATES AND POLYOXYALKYLENE GLYCOLS OR CARBOXYLIC ESTERS

[75] Inventors: Scott T. Jolley; Betsy J. Butke, both of Mentor, Ohio

[73] Assignee: The Lubrizol Corporation, Wickliffe, Ohio

[*] Notice: The portion of the term of this patent subsequent to Oct. 16, 2007 has been disclaimed.

[21] Appl. No.: 571,567

[22] PCT Filed: May 4, 1990

[86] PCT No.: PCT/US90/02495

§ 371 Date: May 29, 1990

§ 102(e) Date: May 29, 1990

[51] Int. Cl.$^5$ .................... C09K 5/04; C10M 105/52
[52] U.S. Cl. .................................. 252/68; 252/47; 252/47.5; 252/67
[58] Field of Search .................... 252/47.5, 67, 68, 47

[56] References Cited

U.S. PATENT DOCUMENTS 4,755,316 7/1988 Magid et al. ........................ 252/68

Primary Examiner—Prince Willis, Jr.
Assistant Examiner—John F. McNally
Attorney, Agent, or Firm—Frederick D. Hunter; Forrest Collins; James A. Cairns

[57] ABSTRACT

A liquid composition is described which comprises
(A) a major amount of at least one fluorine containing hydrocarbon containing one or two carbon atoms; and
(B) a minor amount of at least one soluble organic lubricant comprising at least one organic thiocarbamate characterized by the formulae $$R_1R_2NC(X)SC(R_3R_4)(C(H)(R_5))_a Z, \text{ or tm (I)}$$

$$(R_1R_2NC(X)SC(R_3R_4)(C(H)(R_5))_a C(X)A)_2 Z' \quad (II)$$

wherein $R_1$ and $R_2$ are each independently lower alkyl, aryl, aralkyl or together form a heterocyclic group in which the ring is completed trough the nitrogen;
X is O or S;
A is O, S or NR;
R is H or a lower alkyl group;
$R_3$, $R_4$ and $R_5$ are each independently H, lower alkyl or aryl groups;
a is 0 or 1;
Z is —CN, —S(O)R$_6$, —S(O)OR$_6$, —S(O)$_2$R$_6$, —S(O)$_2$OR$_6$, or —C(O)Y;
$R_6$ is —H, alkyl or aralkyl;
Y is —H, —OH, —R$_7$, —OR$_7$, —OR$_8$OH, or —NR$_9$R$_{10}$;
$R_7$ is an alkyl, aryl or aralkyl group;
$R_8$ is an alkylene group of 1 to about 7 carbon atoms;
$R_9$ and $R_{10}$ are each independently —H, alkyl, hydroxyalkyl, cycloaliphatic, or together form cyclic group in which the ring is completed through the nitrogen atom; and Z' is —R$_8$— or —R$_8$—A—R$_8$—.

The liquid compositions may additionally contain a polyoxyalkylene glycol or a carboxylic ester. Liquid compositions also are described wherein the fluorine-containing hydrocarbons also contain other halogen such as chlorine. The liquid compositions are useful particularly as refrigeration liquids in refrigerators and air-conditioners including auto, home and industrial air-conditioners.

27 Claims, No Drawings

LIQUID COMPOSITIONS CONTAINING THIOCARBAMATES AND POLYOXYALKYLENE GLYCOLS OR CARBOXYLIC ESTERS

FIELD OF THE INVENTION

This invention relates to liquid compositions comprising a major amount of at least one fluorine-containing hydrocarbon, and a minor amount of at least one lubricant. More particularly, the invention relates to liquid compositions useful as refrigeration liquids.

BACKGROUND OF THE INVENTION

Chlorofluorocarbons, generally referred to in the industry as CFCs, have been widely used as propellants in aerosols. The use in aerosols has been diminishing in recent years as a result of demands of environmentalists for the reduction if not a complete ban on the use of CFCs. CFCs have a detrimental effect on the stratosphere's ozone layer. CFCs also have been used because of their unique combination of properties as refrigerants, foam-blowing agents, and specialty solvents within the electronics and aerospace industries. Examples of CFCs which have been utilized for these purposes include CFC-11 which is chlorotriflouromethane, CFC-12 which is dichlorodifluoromethane, and CFC-113 which is 1,2,2-trifluoro-1,1,2-trichloroethane.

Since 1976, when the aerosol industry began to feel the pressure to reduce if not eliminate the use of CFCs, the aerosol industry has progressively moved toward the substitution of hydrocarbon propellants for CFC propellants. The hydrocarbons, such as butane, are readily available and inexpensive, and the quality of the final product generally has been unaffected by the substitution of propellants. However, the problem of finding a safe replacement for CFC refrigerants and foam-blowing agents has been more difficult to solve. Several replacement candidates have been suggested as alternatives to the fully halogenated hydrocarbons, and these include halogenated hydrocarbons containing at least some hydrogen atoms such as HCFC-22 which is difluorochloromethane, HCFC-123 which is 1,1-dichloro-2,2,2-trifluoroethane, HFC-134a which is 1,1,1,2-tetrafluoroethane and HCFC-141b which is 1,1-dichloro-1-fluoroethane.

The ozone depletion potential of these proposed substitutes is significantly less than the ozone depletion potential of the previously used CFCs. The ozone depletion potential is a relative measure of the capability of the material to destroy the ozone layer in the atmosphere. It is a combination of the percentage by weight of chlorine (the atom that attacks the ozone molecule) and the lifetime in the atmosphere. HCFC-22 and HFC-134a generally are recommended as being candidates in refrigerant applications, and HFC-134a is particularly attractive because its ozone depletion potential has been reported as being zero.

In order for any of the replacement materials to be useful as refrigerants, the materials must be compatible with the lubricant utilized in the compressor. The presently used refrigerants such as CFC-12 are readily compatible with mineral lubricating oils which are utilized as the lubricant in air-conditioner compressors. The above-described refrigerant candidates, however, have different solubility characteristics than the refrigerants presently in use. For example, mineral lubricating oil is incompatible (i.e., insoluble) with HFC-134a. Such incompatibility results in unacceptable compressor life in compression-type refrigeration equipment including refrigerators and air-conditioners including auto, home and industrial air-conditioners. The problem is particularly evident in automotive air-conditioning systems since the compressors are not separately lubricated, and a mixture of refrigerant and lubricant circulates throughout the entire system.

In order to perform as a satisfactory refrigeration liquid, the mixture of refrigerant and lubricant must be compatible and stable over a wide temperature range such as from about 0° C. and above 80° C. It is generally desirable for the lubricants to be soluble in the refrigerant at concentrations of about 5 to 15% over a temperature range of from −40° C. to 80° C. These temperatures generally correspond to the working temperatures of an automobile air-conditioning compressor. In addition to thermal stability, the refrigeration liquids must have acceptable viscosity characteristics which are retained even at high temperatures, and the refrigeration liquid should not have a detrimental effect on materials used as seals in the compressors.

Compositions comprising a tetrafluoroethane and polyoxyalkylene glycols are discussed in U.S. Pat. No. 4,755,316. The compositions are useful in refrigeration systems. Refrigeration oils are described in U.S. Pat. Nos. 4,248,726 and 4,267,064 which comprise mixtures of a polyglycol and 0.1 to 10% of glycidyl ether type epoxy compounds, or epoxidized fatty acid monoesters, and optionally, epoxidized vegetable oil. The lubricating oils are reported to be useful in refrigerators using a halogen-containing refrigerant such as Freons 11, 12, 13, 22, 113, 114, 500 and 502 (available from Dupont), and in particular with Freon 12 or 22.

U.S. Pat. No. 4,431,557 describes fluid compositions comprised of a fluoro- and chloro-containing refrigerant, a hydrocarbon oil, and an alkylene oxide additive compound which improves the thermal resistance of the oil in the presence of the refrigerant. Examples of hydrocarbon oils include mineral oil, alkyl benzene oil, dibasic acid ester oil, polyglycols, etc. The composition may contain other additives including load-carrying additives such as phosphorus acid esters, phosphoric acid esters, organic sulfur compounds, etc. Examples of fluorocarbon refrigerants include R-11, R-12, R-113, R-114, R-500, etc.

U.S. Pat. No. 4,428,854 describes absorption refrigerant compositions for use in refrigeration systems comprising 1,1,1,2-tetrafluoroethane and an organic solvent capable of dissolving the ethane. Among the solvents disclosed are organic amides, acetonitrile, N-methyl pyrroles, N-methyl pyrrolidine, N-methyl-2-pyrrolidone, nitromethane, various dioxane derivatives, glycol ethers, butyl formate, butyl acetate, diethyl oxalate, diethyl malonate, acetone, methyl ethyl ketone, other ketones and aldehydes, triethyl phosphoric triamide, triethylene phosphate, triethyl phosphate, etc.

Stabilized absorption compositions comprising (a) a halogenated hydrocarbon refrigerant, (b) a liquid absorbent of a polyethylene glycol methyl ether, and (c) at least one stabilizer are described in U.S. Pat. No. 4,454,052. Examples of stabilizers include phosphate esters, epoxy compounds, and organotin compounds. The polyethylene glycol methyl ether-type compounds are of the general formula

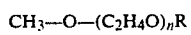

$CH_3-O-(C_2H_4O)_nR$ wherein n is an integer of 1 to 6, and R is H, CH₃— or CH₃CO—. A variety of halogenated hydrocarbons are described including 1,1-difluoromethane, 1,1,1,2-tetrafluoroethane, etc.

U.S. Pat. No. 4,559,154 relates to absorption heat pumps utilizing as working fluid, a saturated fluorohydrocarbon or fluorohydrocarbon ether having from 3 to 5 carbon atoms. Solvents reported to be useful with such fluorohydrocarbons include ethers such as tetraglyme, amides which can be lactams such as the N-alkyl pyrrolidones, sulfonamides and ureas including cyclic ureas.

SUMMARY OF THE INVENTION

A liquid composition is described which comprises
(A) a major amount of at least one fluorine containing hydrocarbon containing one or two carbon atoms; and
(B) a minor amount of at least one soluble organic lubricant comprising at least one organic thiocarbamate characterized by the formulae $$R_1R_2NC(X)SC(R_3R_4(C(H)(R_5))_aZ, \text{ or} \quad (I)$$

$$(R_1R_2NC(X)SC(R_3R_4)(C(H)(R_5))_aC(X)A)_2Z' \quad (II)$$

wherein $R_1$ and $R_2$ are each independently lower alkyl, aryl, aralkyl or together form a heterocyclic group in which the ring is completed through the nitrogen;
X is independently O or S;
A is O, S or NR;
R is H or a lower alkyl group;
$R_3$, $R_4$ and $R_5$ are each independently H, lower alkyl or aryl groups;
a is 0 or 1;
Z is —CH, —S(O)R₆, —S(O)OR₆, —S(O)₂R₆, —S(O)₂OR₆, or —C(O)Y;
R₆ is H, alkyl or aralkyl;
Y is H, —OH, —R₇, —OR₇, —OR₈OH, or —NR₉R₁₀;
R₇ is an alkyl, aryl or aralkyl group;
R₈ is an alkylene group of 1 to about 7 carbon atoms;
R₉ and R₁₀ are each independently H, alkyl, hydroxyalkyl, cycloaliphatic, or together form a cyclic group in which the ring is completed through the nitrogen atoms; and
Z' is —R₈— or —R₈—A—R₈—.

Liquid compositions also are described wherein the fluorine-containing hydrocarbons also contain other halogen such as chlorine. The liquid compositions are useful particularly as refrigeration liquids in refrigerators and air-conditioners including auto, home and industrial air-conditioners.

DESCRIPTION OF THE PREFERRED EMBODIMENTS

Throughout this specification and claims, all parts and percentages are by weight, temperatures are in degrees Celsius, and pressures are at or near atmospheric pressure unless otherwise clearly indicated.

As used in this specification and in the appended claims, the terms "hydrocarbyl" and "hydrocarbylene" denote a group having a carbon atom directly attached to the polar group and having a hydrocarbon or predominantly hydrocarbon character within the context of this invention. Such groups include the following:

(1) Hydrocarbon groups; that is, aliphatic, (e.g., alkyl or alkenyl), alicyclic (e.g., cycloalkyl or cycloalkenyl), and the like, as well as cyclic groups wherein the ring is completed through another portion of the molecular (that is, any two indicated substituents may together form an alicyclic group). Such groups are known to those skilled in the art. Examples include methyl, ethyl, octyl, decyl, octadecyl, cyclohexyl, etc.

(2) Substituted hydrocarbon groups; that is, groups containing non-hydrocarbon substituents which, in the context of this invention, do not alter the predominantly hydrocarbon character of the group. Those skilled in the art will be aware of suitable substituents. Examples include halo, hydroxy, alkoxy, etc.

(3) Hetero groups; that is, groups which, while predominantly hydrocarbon in character within the context of this invention, contain atoms other than carbon in a chain or ring otherwise composed of carbon atoms. Suitable hetero atoms will be apparent to those skilled in the art and include, for example, nitrogen, oxygen and sulfur.

In general, no more than about three substituents or hetero atoms, and preferably no more than one, will be present for each 10 carbon atoms in the hydrocarbyl group.

Terms such as "alkyl", "alkylene", etc. have meanings analogous to the above with respect to hydrocarbyl and hydrocarbylene.

The term "hydrocarbon-based" also has the same meaning and can be used interchangeably with the term hydrocarbyl when referring to molecular groups having a carbon atom attached directly to the polar group.

The term "lower" as used herein in conjunction with terms such as hydrocarbyl, hydrocarbylene, alkylene, alkyl, alkenyl, alkoxy, and the like, is intended to describe such groups which contain a total of up to 7 carbon atoms.

When a compound or component is indicated herein as being "soluble", the compound or component is soluble in the liquid compositions of the invention comprising the fluorine-containing hydrocarbon and the lubricant. For example, a compound or component is considered "soluble" so long as it is soluble in the liquid compositions, even through it may be insoluble in the fluorine-containing hydrocarbon per se.

(A) Fluorine-Containing Hydrocarbon

The liquid compositions of the present invention comprise a major amount of at least one fluorine-containing hydrocarbon. That is, the fluorine-containing hydrocarbons contain at least one C—H bond as well as C—F bonds. In addition to these two essential types of bonds, the hydrocarbon also may contain other carbon-halogen bonds such as C—Cl bonds. Because the liquid compositions of the present invention are primarily intended for use as refrigerants, the fluorine-containing hydrocarbon preferably contains one or two carbon atoms, and more preferably two carbon atoms.

As noted above, the fluorine-containing hydrocarbons useful in the liquid compositions of the present invention may contain other halogens such as chlorine. However, in one preferred embodiment, the hydrocarbon contains only carbon, hydrogen and fluorine. These compounds containing only carbon, halogen and fluorine are referred to herein as fluorohydrocarbons. The hydrocarbons containing chlorine as well as fluorine and hydrogen are referred to as chlorofluorohydrocarbons. The fluorine-containing hydrocarbons useful in the composition of the present invention are to be distinguished from the fully halogenated hydrocarbons which have been and are being used as propellants, refrigerants and blowing agents such as CFC-11, CFC-12 and CFC-113 which have been described in the background.

Specific examples of the fluorine-containing hydrocarbons useful in the liquid compositions of the present invention, and their reported ozone depletion potentials are shown in the following Table I.

TABLE I

| Compound Designation | Formula | ODP* |
|---|---|---|
| HCFC-22 | $CHClF_2$ | 0.05 |
| HCFC-123 | $CHCl_2CF_3$ | <0.05 |
| HCFC-141b | $CH_3CCl_2F$ | <0.05 |
| HFC-134a | $CH_2FCF_3$ | 0 |

*Ozone depletion potential as reported in Process Engineering, pp. 33–34, July, 1988.

Examples of other fluorine-containing hydrocarbons which may be useful in the liquid compositions of the present invention include trifluoromethane (HFC-23), 1,1,1-trifluoroethane (HFC-143a), 1,1-difluoroethane (HFC-152a), 2-chloro-1,1,1,2-tetrafluoroethane (HCFC-124), 1-chloro-1,1,2,2-tetrafluoroethane (HCFC-124a), 1-chloro-1,1-difluoroethane (HCFC-142b), and 1,1,2,2-tetrafluoroethane (HFC-134). In the refrigerant art, the fluorohydrocarbons are often identified merely with the prefix "R" in place of the above letters. For example HFC-23 is R-23, HCFC-124 is R-124, etc.

In general, fluorine-containing hydrocarbons which are useful as refrigerants are fluoromethanes and fluoroethanes boiling at a relatively low temperature at atmospheric pressure, e.g., below 30° C. Mixtures of fluorine-containing hydrocarbons may be used, and the amount of each fluorohydrocarbon in the mixture may be varied as desired. Examples of fluorohydrocarbon mixtures useful as (A) include: 142(b)/22; 134(a)/23; 22/124/152(a), etc. The useful fluorocarbon refrigerants serve to transfer heat in a refrigeration system by evaporating and absorbing heat at a low temperature and pressure, e.g., at ambient temperature and atmospheric pressure, and by releasing heat on condensing at a higher temperature and pressure.

The liquid compositions of the present invention contain a major amount of the fluorine-containing hydrocarbon. More generally, the liquid compositions will comprise from about 50% to about 99% by weight of the fluorine-containing hydrocarbon. In another embodiment, the liquid compositions contain from about 70% to about 99% by weight of the fluorine-containing hydrocarbon.

(B) Soluble Organic Thiocarbamate

In addition to the fluorine-containing hydrocarbons described above, the liquid compositions of the present invention also contain a minor amount of at least one organic thiocarbamate. In one embodiment, the organic thiocarbamate is characterized by the formula

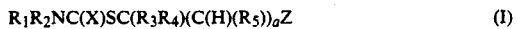

$$R_1R_2NC(X)SC(R_3R_4)(C(H)(R_5))_aZ \qquad (I)$$

wherein $R_1$ and $R_2$ are each independently lower alkyl, aryl, aralkyl, or together form a heterocyclic group in which the ring is completed through the nitrogen;

$R_3$, $R_4$ and $R_5$ are each independently H, lower alkyl or aryl groups;

a is 0 or 1;

Z is $-CH$, $-S(O)R_6$, $-S(O)OR_6$, $-S(O)_2R_6$, $-S(O)_2OR_6$, or $-C(O)Y$;

$R_6$ is H, alkyl or aralkyl;

Y is $-H$, $-OH$, $R_7$, $-OR_7$, $-OR_8OH$ or $-NR_9R_{10}$;

$R_7$ is an alkyl, aryl or aralkyl group;

$R_8$ is an alkylene group of 1 to about 7 carbon atoms; and $R_9$ and $R_{10}$ are each independently H, alkyl, hydroxyalkyl, cycloaliphatic or together form a cyclic group in which the ring is completed through the nitrogen atom.

A preferred group of compounds within the dithiocarbamates of Formula I includes compounds where X is $-S$, $R_3$, $R_4$ and $R_5$ are $-H$ or lower alkyl groups, a is 1 and Z is $-C(O)Y$ wherein Y is $-OH$, $-R_7$, $-OR_7$, $-OR_8OH$ or $-NR_9R_{10}$, and $R_7$, $R_8$, $R_9$ and $R_{10}$ are as defined above.

Another preferred embodiment of dithiocarbamates is defined by Formula I wherein X is $-S$, $R_3$ and $R_4$ are $-H$ or methyl, and Y is $-OH$, $-OR_7$ wherein $R_7$ is methyl or ethyl, $-OR_8OH$ wherein $R_8$ is an alkylene group of from 1 to about 4 carbon atoms, and $-NR_9R_{10}$ wherein $R_9$ and $R_{10}$ are $-H$.

In another preferred embodiment, the dithiocarbamates (B) are characterized by the formula

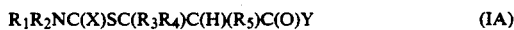

$$R_1R_2NC(X)SC(R_3R_4)C(H)(R_5)C(O)Y \qquad (IA)$$

wherein $R_1$ and $R_2$ are each independently lower alkyl or hydroxyalkyl groups or together form a heterocyclic group in which the ring is completed through the nitrogen;

X is $-O$ or $-S$;

$R_3$, $R_4$ and $R_5$ are each independently $-H$ or lower alkyl groups;

Y is $-H$, $-OH$, $-R_7$, $-OR_7$, $-OR_8OH$, or $-NR_9R_{10}$;

$R_7$ is a lower alkyl group;

$R_8$ is an alkylene group of 1 to about 7 carbon atoms;

$R_9$ and $R_{10}$ are each independently H, alkyl, hydroxyalkyl, cycloaliphatic, or together form cyclic group in which the ring is completed through the nitrogen atom.

The dithiocarbamates also may be further characterized by the formula

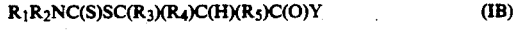

$$R_1R_2NC(S)SC(R_3)(R_4)C(H)(R_5)C(O)Y \qquad (IB)$$

wherein $R_1$ and $R_2$ are each independently lower alkyl groups;

$R_3$, $R_4$ and $R_5$ are each independently $-H$ or lower alkyl groups;

Y is $-OR_7$, $-OR_8OH$, or $-NR_9R_{10}$;

$R_7$, $R_9$ and $R_{10}$ are each independently lower alkyl or hydroxyalkyl groups; and $R_8$ is an alkylene group of 1 to about 7 carbon atoms.

Thiocarbamates of the type characterized by Formulae I, IA and IB can be prepared from an amine, carbon disulfide or carbonylsulfide or source materials for these reactants and a reactant containing an activated, ethylenically-unsaturated bond, or an alpha-chloro or alpha-bromo carboxylic acid or derivative thereof. The reaction can be conducted in one or two steps. In one embodiment, all of the reactants are charged to a reactor and then reacted in one step. These reactants are charged to a reactor and stirred without heating since the reaction is exothermic. Once the reaction reaches the temperature of the exotherm, the reaction mixture is maintained at this temperature to insure a complete reaction, followed by the removal of volatiles under reduced pressure. The mixture is filtered, and the final product is obtained in high yield.

The two-step reaction involves reacting the amine with the carbon disulfide or carbonylsulfide to form a thiocarbamate intermediate. The intermediate then can be reacted either with the activated alpha-olefin or an alpha-halo acid, ester, etc., to form the thiocarbamate of Formula I.

The amine reactant may be represented by the formula $$R_1R_2NH \qquad (III)$$

wherein $R_1$ and $R_2$ are each independently lower alkyl, aryl, aralkyl, or together form a heterocyclic group in which the ring is completed through the nitrogen atom. Specific amines which have been found to be useful within the scope of the present invention include dimethylamine, diethylamine, dipropylamine, dibutylamine, diamylamine, dihexylamine and diheptylamine. Also, there may be mentioned diphenylamine, dibenzylamine and the like. Furthermore, non-symmetric amines such as N-methylethylamine, N-ethylbutylamine, N-ethylamylamine and the like may be found to be useful within the scope of the present invention. Likewise, N-amylaniline and the like may be used.

Among the suitable heterocyclics are aziridines, azetidines, azolidines, pyrrolidine, pyridine, di-, and tetra-hydropyridines, pyrroles, indoles, quinoline, morpholine, picolines, piperidine and the like. Mixtures of two or more of these heterocyclic amines can be used. Typical heterocyclic amines are the saturated 5- and 6-membered heterocyclic amines.

Preferably the amines (III) are dialkyl amines wherein the alkyl groups are lower alkyl groups, and particularly preferred alkyl groups are methyl, ethyl, propyl, and butyl. Specific examples of amines III include: di-n-butyl amine; diethylamine; etc.

With respect to the reactants containing an activated, ethylenically unsaturated bond, these reactants may be illustrated by the following formula:

$$R_3R_4C=C(R_5)Z \qquad (IV)$$

wherein $R_3$, $R_4$, $R_5$ and Z are as defined with regard to Formula I.

As specific species encompassed by the above Formula IV, there may be mentioned methylacrylate, ethylacrylate, 2-ethylhexylacrylate, 2-hydroxyethylacrylate, ethylmethacrylate, 2-hydroxyethylmethacrylate, 2-hydroxypropylmethacrylate, 2-hydroxypropylacrylate, acrylamide, methacrylamide, ethacrylamide, N-(2-hydroxyethyl)acrylamide, N-(2-hydroxymethyl)methacrylamide, acrylonitrile, methyl vinyl sulfone, acrolein, methyl vinyl ketone, ethyl vinyl ketone, ethyl vinyl sulfone, etc.

Alternatively, the reactant may be an alpha halo acid, ester, aldehyde, ketone, nitrile, sulfonyl, sulfinyl compound, etc., such as represented by Formula V $$R_3R_4C(X')Z \qquad (V)$$

wherein $R_3$, $R_4$ and Z are as defined in Formula I, and X' is a halogen, particularly chlorine or bromine. Specific examples of such reactants include alpha-chloroacetic acid, alpha-bromoacetic acid, alpha-chloroacetic acid ethyl ester, 2-chloropropionic acid, 2-bromopropionic acid, 2-bromohexanoic acid, chloroacetonitrile, bromoacetonitrile, etc.

The relative amounts of the reactants, discussed above, used to prepare the carbamate compounds of Formula I is not particularly critical. The charge ratios to the reactor can vary over a wide range where economics and the amount of the product desired are controlling factors. Thus, the charge ratio of the amine (III) to the $CS_2$ or COS reactant to the ethylenically unsaturated reactant (IV) or alpha-halo reactant (V) may vary 5:1:1 to 1:5:1 to 1:1:5. As a most preferred embodiment, the charge ratios of these reactants will be 1:1:1.

The thiocarbamate(s) (B) used in the compositions of the present invention may also be characterized by the formula $$(R_1R_2NC(X)SC(R_3R_4)(C(H)(R_5))_aC(X)A)_2Z' \qquad (II)$$

wherein $R_1$, $R_2$, $R_3$, $R_4$, $R_5$, X, and a are as defined in Formula I; A is O, S or NR where R is H or a lower alkyl; and Z' is —$R_8$— or —$R_8$—A—$R_8$—, wherein $R_8$ is an alkylene group of 1 to about 7 carbon atoms.

The carbamates of the type represented by Formula II where a=1 can be prepared by reacting an amine as represented by the formula $$R_1R_2NH \qquad (III)$$

as described previously, carbon disulfide or carbonylsulfide or source materials for these reactants, and a reactant containing an activated, ethylenically-unsaturated bond such as represented by Formula VI $$(R_3R_4C=C(R_5)C(X)A)_2Z' \qquad (VI)$$

wherein $R_3$, $R_4$, $R_5$, X, A, and Z' are as defined in Formula II above. Specific examples of such reactants include N,N'-methylenebisacrylamide, N,N'-methylenebismethacrylamide, dimethylene ether bisacrylamide, etc.

The thiocarbamates of Formula II wherein a=0 can be prepared by reacting an amine of Formula III with carbon disulfide or carbonylsulfide or source materials for these reactants, and an alpha-halogen-containing compound of the general formula $$(R_3R_4C(X')C(X)A)_2 \qquad (VII)$$

wherein $R_3$, $R_4$, A, X and Z' are as described in Formula II above, and X' is a halogen, particularly chlorine or bromine. Preferably $R_3$ and $R_4$ are H, and Z' is —$R_8$—. Specific examples of such reactants include:

$$(ClCH_2C(O)O)_2CH_2,$$

$$(ClCH_2C(O)N(H))_2CH_2,$$

$$(CH_3CH(Cl)C(O)O)_2CH_2, \text{ etc.}$$

The relative amounts of reactants used to form the thiocarbamates of Formula II can be varied over a wide range. For example, the charge ratio of the amine to $CS_2$ to COS to ethylenically unsaturated or halogen-containing reactant may vary from 5:1:1 to 1:5:1 to 1:1:5. In one preferred embodiment for preparing thiocarbamates of Formula II, the ratio is 2:2:1 when the third reactant is a bis-olefin such as N,N'-methylenebisacrylamide.

The reaction between the amine (III), CS$_2$ or COS and unsaturated reactants IV and VI or the halogen-containing reactants V and VII is generally exothermic and thus only slight heating may be applied. The reaction is conveniently conducted at from 25° C. to about 100° C. The reaction can be carried out in the presence or absence of a solvent. Desirably, the reaction is conducted in a solvent such as a hydrocarbon (toluene, xylene, hexane, heptane, kerosene, etc.); an alcohol such as methanol, ethanol, butanol, etc.; or a chlorohydrocarbon such as chloroform, carbon tetrachloride, etc. The reaction time is generally brief, and although dependent on temperature, is generally completed in one or two hours or less.

The thiocarbamates of Formula II also can be prepared by coupling thiocarbamates of the type represented by Formula I when Z is a group containing a reactive hydrogen such as —COOH, CON(R$_9$)H, —C(O)OCH$_2$OH, —SO$_2$H, etc. In one embodiment, these compounds are coupled by reacting them with an aldehyde or ketone of the following formula

R$_{11}$C(O)R$_{12}$          (VIII)

wherein R$_{11}$ and R$_{12}$ independently can be hydrogen, an alkyl group having from 1 to 12 carbon atoms, phenyl, or an alkyl-substituted phenyl having from 7 to 12 carbon atoms. Desirably the coupling agent is an aldehyde, i.e., R$_{11}$ is H, having a total of 1 to 3 carbon atoms therein. Formaldehyde and paraformaldehyde are highly preferred and the use of these coupling agents can result in methylene and di-methylene ether coupling groups.

The coupling reaction desirably takes place in the presence of strong mineral or organic acids such as HCl, H$_2$SO$_4$, H$_3$PO$_4$, CH$_3$SO$_3$H, p-toluenesulfonic acid, and the like. The amount of the acid catalyst is generally from about 0.3 to about 1.5% by weight, desirably from about 0.8 to about 1.2%, and preferably from about 0.9 to about 1.1% by weight based upon the weight of the total product formed. Although lesser amounts of catalyst can be utilized, the reaction is generally slower and a smaller amount of the desired product is formed. The reaction with an aldehyde or ketone initially takes place at a temperature of from about 80° C. to about 120° C. and desirably from about 80° C. to about 100° C. in an inert atmosphere. The final reaction temperature is generally higher as from about 100° C. to about 150° C. and desirably from about 125° C. to about 135° C.

Alternatively, if one wishes to stop at the intermediate carbinol stage, (e.g., —C(O)CH$_2$OH) the reaction between the thiocarbamate (I) and the coupling agent (VIII) is best carried out using basic catalysts, i.e., NaHCO$_3$, KHCO$_3$, Na$_2$CO$_3$, K$_2$CO$_3$, NaOH, KOH, etc. This reaction mixture can be neutralized with acid and heated to remove water to form an ether linkage (e.g., —CH$_2$O—CH$_2$—); reacted with H$_2$S, NaHS or Na$_2$S or other source of divalent sulfur to form a thio linkage (e.g., —CH$_2$SCH$_2$—); or, NH$_3$ or R"NH$_2$ where R" is alternatively H, alkyl or 1-60 carbon atoms, aryl, alkyl substituents, aryl or aryl-substituted alkyl of 6-30 carbon atoms or acyl of 1-22 carbon atoms to form the amino linkage (e.g., —CH$_2$N(R")CH$_2$—).

The amount of thiocarbamate I reacted with coupling agent (VIII) is from about 0.3 to about 3.0 moles utilized per mole of said agent (VIII) with a 2:1 molar ratio being preferred. The coupler may be a mixture of different couplers and preferably includes paraformaldehyde.

The combination of formaldehyde and the thiocarbamate containing amide compound as described above may couple two amides or may result in the formation of a —CH$_2$OH on the nitrogen atom of the amide. Two of such amides with a —CH$_2$OH group thereon may then be reacted to form a coupled amide with the coupling group being

—CH$_2$OCH$_2$—.

The preparation of specific thiocarbamates (B) useful in this invention is illustrated in the examples that follow. In the following examples, and elsewhere in the present specification and claims, all parts and percentages are by weight, all temperatures are in degrees Celsius, and pressures are at or near atmospheric unless otherwise clearly indicated.

EXAMPLE 1

A 1-liter, 4-necked flask is fitted with a mechanical stirrer, thermometer, addition funnel and a water cooled reflux condenser. It is charged with 116 parts of 2-hydroxyethylacrylate and 76 parts CS$_2$. Dibutylamine (129 parts) is added over 3 hours with an exotherm to 47° C. The mixture is stirred for 2 hours. Heating is continued at 45°-55° C. and held at this temperature for 2.5 hours. The mixture is cooled and vacuum stripped at 68° C. and 9 mm Hg. No distillate is collected. The reaction mixture is filtered through diatomaceous earth, and a clear yellow liquid is recovered.

EXAMPLE 2

A 1-liter flask is fitted with a mechanical stirrer, thermometer, addition funnel and a water-cooled reflux condenser. The flask is charged with 71 parts of acrylamide and 60 parts of 95% ethanol. This mixture is stirred at room temperature for ¾ hour. An additional 40 parts of 95% ethanol is added to completely dissolve the acrylamide. To the solution is added 76 parts of CS$_2$. Diamylamine (157 parts) is added over 1.23 hours. An exotherm to 41° C. occurs. This mixture is heated and held at 50°-55° C. for 3 hours. The mixture is subsequently vacuum stripped at 91° C. and 20 mm Hg to yield 113 parts of distillate. The residue is filtered through diatomaceous earth filter aid with a filtrate yield of 281 parts of clear, yellow, viscous liquid. This represents a 92.4% yield based on a theoretical yield of 304 parts.

EXAMPLE 3

A 1-liter flask is fitted with a mechanical stirrer, thermometer, an addition funnel and a Dry Ice/isopropanol condenser. The flask is charged with 157 parts of diamylamine. Carbon disulfide (76 parts) is added while stirring the mixture. This addition produces an exotherm to approximately 55° C. in approximately 50 minutes. To the flask are added 50 parts of toluene after which 56 parts of acrolein are added at 25° C. over ¾ hour. This addition produces an exotherm to 45° C. The mixture is stirred and allowed to cool to room temperature for 6 hours. This mixture is then stirred for another 4.5 hours at 50° C. and allowed to stand overnight. The mixture is then vacuum stripped at 85° C. and 8 mm Hg to give 64 parts of distillate. The residue is filtered through diatomaceous earth filter aid to give 240 parts of filtrate which is a clear, viscous red liquid. This represents an 83% yield based on 289 parts theoretical.

EXAMPLE 4

A 1-liter flask is fitted with a mechanical stirrer, thermometer, addition funnel and a water-cooled reflux condenser. The flask is charged with 172 parts of methylacrylate and 152 parts of $CS_2$. This mixture is stirred at room temperature and 146 parts of diethylamine are added over 2.75 hours, producing an exotherm to 62° C. The mixture is then held at 55° C. for 2.50 hours and then allowed to cool while standing overnight. The reaction mixture is then stirred and heated to approximately 55° C. and held at that temperature for 2 hours. The mixture is vacuum stripped at 73° C. and 9 mm Hg and the residue is filtered through diatomaceous earth filter aid to give 447 parts of a clear, brown filtrate. This represents a 95.1% yield based on a theoretical yield of 470 parts.

EXAMPLE 5

A 1-liter flask is fitted with a mechanical stirrer, thermometer, addition funnel and a water-cooled reflux condenser. The flask is charged with 86 parts of methylacrylate and 76 parts $CS_2$. This mixture is stirred at room temperature, and 129 parts of dibutylamine are added. This addition takes place over 2 hours and produces an exotherm to 53° C. for 4 hours. The mixture is then vacuum stripped to 76° C. at 8 mm Hg and the residue is filtered through diatomaceous earth filter aid to give 274 parts of a clear, yellow filtrate.

EXAMPLE 6

A 1-liter flask is fitted with a mechanical stirrer, thermometer, addition funnel and a water-cooled reflux condenser. The flask is charged with 116 parts of 2-hydroxyethylacrylate and 76 parts $CS_2$. This mixture is stirred at room temperature and 157 parts of diamylamine are added over 1.3 hours. This addition produces an exotherm to 68° C. The mixture is allowed to cool for 0.75 hour and stand overnight. The mixture is then heated and stirred to approximately 60°-65° C. for 2 hours, and then vacuum stripped at 98° C. and 10 mm Hg. A trace of distillate is collected. The residue is filtered through 10 parts of diatomaceous earth to give 332 parts of a clear, yellow filtrate.

EXAMPLE 7

At 40° C., 76 parts of carbon disulfide are added dropwise over 0.75 hour to a mixture of 129 parts dibutylamine, 150 parts isopropyl alcohol and 10 parts of a 50% solution of sodium hydroxide. The reaction temperature is maintained between 25°-40° C. for 1.5 hours, and then raised to 50° C. while adding incrementally 101 parts of N-hydroxymethyl acrylamide over one hour. The reaction temperature is raised to 70° C. and maintained for 3 hours. A 5 mm vacuum is applied and the reaction temperature is raised to 130° C. The residue is filtered through diatomaceous earth, and the filtrate is the product.

EXAMPLE 8

At 40° C., 76 parts of carbon disulfide are added over 0.75 hour to a mixture of 129 parts of dibutylamine and 150 parts of isopropyl alcohol. The reaction temperature is maintained between 25°-40° C. for 1.5 hours. When the reaction mixture is a clear yellow solution, 71 parts of acrylamide are added incrementally over one hour. The reaction temperature is raised to 70° C. and maintained for 3 hours. A 5 mm vacuum is applied and the temperature is raised to 155° C. The residue is cooled to room temperature, and 33 parts of paraformaldehyde are added. The reaction temperature is raised to 90°-100° C. under nitrogen and maintained for one hour. A 5 mm vacuum is applied while raising the reaction temperature to 115° C. The residue is filtered through diatomaceous earth, and the filtrate is the desired product.

The thiocarbamates (B) characterized by Formulae I and II preferably are free of acetylenic and aromatic unsaturation. Some compounds of Formulae I and II which contain such unsaturation may be insoluble in the fluorine-containing hydrocarbons. The soluble thiocarbamates of this invention also are preferably free of olefinic unsaturation except that some olefinic unsaturation may be present so long as the thiocarbamate is soluble.

The thiocarbamates of Formula I and II are soluble in fluorine-containing hydrocarbons and, in particular, in the fluorohydrocarbons such as 1,1,1,2-tetrafluoroethane. The thiocarbamates are soluble over a wide temperature range and, in particular, at low temperatures. The solubility of the thiocarbamates in fluorohydrocarbons such as 1,1,1,2-tetrafluoroethane at low temperatures is determined in the following manner. The thiocarbamate (0.5 gram) is placed in a thick-walled glass vessel equipped with a removable pressure gauge. The tetrafluoroethane (4.5 grams) is condensed into the cooled ($-40°$ C.) glass vessel, and the contents are warmed to the desired temperature and mixed to determine if the thiocarbamate is soluble in the tetrafluoroethane. If soluble, the temperature of the mixture is reduced until a separation and/or precipitate is observed. In this solubility test, the thiocarbamate of Example 5 is found to be soluble to $-5°$ C.

Liquid Compositions

The liquid compositions of the present invention comprise a major amount of a fluorine-containing hydrocarbon and a minor amount of at least one soluble thiocarbamate of the types described above. "Major amount" is meant to include an amount equal to or greater than 50% by weight such as 50.5%, 70%, 99%, etc. The term "minor amount" includes amounts less than 50% by weight such as 1%, 5%, 20%, 30% and up to 49.9%. In one embodiment, the liquid compositions of the present invention will comprise from about 70 to about 99% of the fluorine-containing hydrocarbon (A) and from about 0.1% to about 30%, preferably from about 0.5% to about 25%, more preferably from about 1% to about 22% by weight of the thiocarbamate (B). In another embodiment, the thiocarbamate (B) may be used as a lubricant or a component of a lubricant formulation. (B) is present, as a lubricant, in an amount from about 9% to about 30%, preferably about 9% to about 25%, more preferably about 10% to about 20% by weight of the liquid compositions. Lubricants for stationary compressor systems should have a kinematic viscosity at 100° C. of at least 3 centistokes (cSt), preferably about 3 cSt to about 2000 cSt, more preferably about 3 to about 20. For mobile air-conditioning systems, the lubricant should have a viscosity at 100° C. greater than about 10 cSt, preferably from about 10 cSt to about 2000 cSt, more preferably about 10 to about 50.

In another embodiment, the thiocarbamate (B) is present as an additive in a lubricant formulation. When (B) is an additive, it is present in an amount from about 0.1% to about 8%, preferably about 0.5% to about 6%, more preferably from 0.75% to about 5% by weight, i.e., fluorine-containing hydrocarbon plus lubricant. Preferably the lubricant formulation contains a polyoxyalkylene glycol (C-1) or a carboxylic ester (C-2 or C-3) about 25% by weight of the liquid composition, more preferably from about 10 to about 20%.

(C) Polyoxyalkylene Glycol or Carboxylic Ester

The polyoxyalkylene glycol (C-1) or carboxylic ester (C-2 & C-3) is present in an amount up to where the total amount of thiocarbamate plus the amount of polyoxyalkylene glycol or carboxylic ester is in a "minor amount", up to about 49.9% by weight. Preferably the polyoxyalkylene glycol or carboxylic ester is present in an amount up to 40% by weight, more preferably up to 30% by weight, more preferably up to 20% by weight.

In another embodiment, the combined amount of the thiocarbamate and the polyoxyalkylene glycol or carboxylic ester are present in an amount from about 5% to about 40%, preferably from about 7.5% to about 30%, more preferably from about 10% to about 20%, where all percentages are by weight of the liquid composition.

Useful polyoxyalkylene glycols (C-1) have a molecular weight between about 300 and about 2000, a viscosity of about 25 to 150 centistokes at 37° C., and a viscosity index of at least 20. The polyoxyalkylene glycols may be polyoxyethylene glycols or polyoxypropylene glycols. Useful polyoxyethylene glycols are available from Union Carbide under the trade name Carbowax PEG 600, 1000 and 1450. The polyoxyalkylene glycols are preferably polyoxypropylene glycols where the oxypropylene units are at least 80% of the total. The remaining 20% may be ethylene oxide or butylene oxide or other such esters, olefins and the like which may be polarized with polypropylene oxide. Useful polyoxypropylene glycols are available from Union Carbide under the trade names NIAX 425 and NIAX 1025. Useful polyoxypropylene glycols are available from Dow Chemical and sold by the trade names PPG-1200 and PPG-2000.

Polyoxyalkylene glycols useful as refrigerator lubricants are described in U.S. Pat. No. 4,755,316 issued to Magid et al. The patent is hereby incorporated by reference for its disclosure to polyoxyalkylene glycols and their use in refrigeration systems.

In one embodiment, the carboxylic ester comprises (C-2) at least one carboxylic ester compound characterized by the following formula

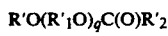  (IV)

or

  (V)

wherein
R' is a hydrocarbyl group of at least 2 carbon atoms,
R'$_1$ is a hydrocarbylene group,
R'$_2$ is —H, hydrocarbyl, —CF$_3$, —R'$_4$CN, —R'$_4$NO$_2$, or —R'$_5$OCH(R'$_6$)—,
R'$_3$ is a —R'$_4$CF$_3$, —R'$_4$CN or —R'$_4$NO$_2$ group, provided that R'$_3$ may be a hydrocarbyl group when R'$_2$ is —R'$_4$CN,
q is an integer from 1 to about 50,
R'$_4$ is a hydrocarbylene group,
R'$_5$ is H, a lower hydrocarbyl group or R'$_7$C(O)— where R'$_7$ is a hydrocarbyl group, and
R'$_6$ is H or a lower hydrocarbyl group.

In the above Formulae (IV) and (V), R' is a hydrocarbyl group of at least 2 carbon atoms and more particularly is an alkyl group containing from 2 to about 50 carbon atoms. Branched-chain alkyl groups are particularly useful as R' groups since the presence of the branching appears to improve the solubility of the lubricant in the fluorine-containing hydrocarbon. Examples of R' groups include ethyl, propyl butyl, hexyl octyl, decyl, dodecyl, tridecyl, hexadecyl, octadecyl, higher alkyl groups, and mixtures of one or more of these. R'$_1$ is a hydrocarbylene group preferably containing from 1 to about 7 carbon atoms. Alkylene groups such as methylene, ethylene, propylene, 2-methyl ethylene, 2-ethyl ethylene, etc., are examples of hydrocarbylene groups useful as R'$_1$. When R'$_2$ is a hydrocarbyl group, R'$_2$ generally will contain from 1 to about 20 carbon atoms and more often will be a lower alkyl group such as methyl, ethyl, propyl, butyl, etc.

R'$_2$ in Formulae (IV) and (V) also may be hydrogen, —CF$_3$, —R'$_4$CN, —R'$_4$NO$_2$ or R'$_5$OCH(R'$_6$)— wherein R'$_4$ is a hydrocarbylene group, preferably an alkylene group, R'$_5$ is a lower hydrocarbyl group or R'$_7$C(O)— wherein R'$_7$ is a hydrocarbyl group, and R'$_6$ is —H or a lower hydrocarbyl group. The hydrocarbylene group R'$_4$, in one embodiment, is an alkylene group containing from 1 to about 20 carbon atoms, and the alkylene group may be straight chain or branched chain. R'$_5$ may be a lower hydrocarbyl group, and specific examples of such groups include methyl, ethyl, propyl, etc. R'$_7$ is a hydrocarbyl group which may contain from 1 to about 20 carbon atoms, and in one embodiment this hydrocarbyl group also is a lower hydrocarbyl group.

The compositions represented by Formula (IV) may be prepared by techniques well known in the art. In one embodiment, esters of the type represented by Formula (IV) are prepared by the reaction of a carboxylic acid R'$_2$COOH (or its anhydride) with an alkoxy alcohol such as represented by the formula R'O(R'$_1$O)$_q$H wherein R', R'$_1$ and q are as defined above with respect to Formula (IV). In one embodiment, R'$_1$ is a branched-chain hydrocarbylene group containing 3, 4, or 5 carbon atoms. For example R'$_1$ may be a methyl- or ethyl-substituted ethylene group derived from propylene oxide or butylene oxide.

The carboxylic acid, R'$_2$COOH, which may be reacted with the alkoxy alcohol, can be any of the carboxylic acids wherein R'$_2$ is —H, hydrocarbyl, —CF$_3$, —R'$_4$CN, —R'$_4$NO$_2$, or R'$_5$OCH(R'$_6$)— wherein R'$_4$, R'$_5$ and R'$_6$ are as defined above with respect to Formulae (IV) and (V). The following examples will illustrate the various types of carboxylic acids exemplified by the formula R'$_2$COOH and some anhydrides of such acids: formic acid, acetic acid, acetic anhydride, propionic acid, trifluoroacetic acid, trifluoroacetic acid anhydride, cyanoacetic acid, cyanoundecanoic acid, nitroacetic acid, 3-nitropropionic acid, glycolic acid, lactic acid, methoxyacetic acid, ethoxyacetic acid, acetylacetic acid, etc.

A variety of alkoxy alcohols are known in the art, and many are available commercially. The alkoxy alcohols are produced generally by treating an aliphatic alcohol such as a fatty alcohol with an excess of an alkylene oxide such as ethylene oxide or propylene oxide. For example, from about 6 to about 40 moles of ethylene oxide or propylene oxide may be condensed with the aliphatic alcohol.

In one embodiment, the aliphatic alcohol contains from about 14 to about 24 carbon atoms and may be derived from long chain fatty alcohols such as oleyl alcohol or stearyl alcohol.

The alkoxy alcohols useful in the present invention are available commercially under such trade names as "TRITON®" from Rohm & Haas Company, "TERGITOL®" from Union Carbide, "ALFONIC®" from Conoco Chemicals Company, and "NEODOL®" from Shell Chemical Company. The TRITON® materials are identified generally as polyethoxylated alcohols or phenols. The TERGITOLS® are identified as polyethylene glycol ethers of primary or secondary alcohols; the ALFONIC® materials are identified as ethoxylated linear alcohols which may be represented by the general structural formula

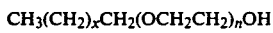

$$CH_3(CH_2)_xCH_2(OCH_2CH_2)_nOH$$

wherein x varies between 4 and 16 and n is a number between about 3 and 11. Specific examples of ALFONIC® ethoxylates characterized by the above formula include ALFONIC® 1012-60 wherein x is about 8 to 10 and n is an average of about 5 to 6; ALFONIC® 1214-70 wherein x is about 10-12 and n is an average of about 10 to about 11; ALFONIC® 1412-60 wherein x is from 10-12 and n is an average of about 7; and ALFONIC® 1218-70 wherein x is about 10-16 and n is an average of about 10 to about 11.

The NEODOL® ethoxylates are ethoxylated alcohols wherein the alcohols are a mixture of alcohols containing from 12 to about 15 carbon atoms, and the alcohols are branched chain primary alcohols. The ethoxylates are obtained by reacting the alcohols with an excess of ethylene oxide such as from about 3 to about 12 or more moles of ethylene oxide per mole of alcohol. For example, NEODOL® ethoxylate 23-6.5 is a branched chain alcoholate of 12 to 13 carbon atoms with an average of about 6 to about 7 ethoxy units.

In another embodiment, the carboxylic esters may be characterized by the following formula $$R'_3OC(O)R'_2 \quad (V)$$

wherein $R'_2$ is —H, hydrocarbyl, hydrocarbyloxy hydrocarbyl, —CF$_3$, —R'$_4$CN, —R'$_4$NO$_2$ or R'$_5$OCH(R'$_6$)—, and $R'_3$ is a —R'$_4$CF$_3$, —R'$_4$CN or —R'$_4$NO$_2$ group wherein R'$_4$, R'$_5$ and R'$_6$ are as defined in Formula (IV), provided that R'$_3$ may be a hydrocarbyl group when R'$_2$ is —R'$_4$CN. Such carboxylic esters can be prepared by techniques known in the art such as, for example, by the reaction off a carboxylic acid, R'$_2$COOH, as described above, or the anhydride of said acid with hydroxy-containing compounds such as the following: R'$_3$OH; HOR'$_4$CN; HOR'$_4$NO$_2$; HOR'$_4$CF$_3$; wherein R'$_4$ is a hydrocarbylene group. In one embodiment, R'$_4$ is a straight chain or branched chain alkylene group, containing from about 1 to 20 carbon atoms and more particularly, from 1 to about 10 carbon atoms.

As noted above, R'$_3$ in Formula (V) may be a hydrocarbyl group when R'$_2$ is —R'$_4$CN. The hydrocarbyl group may contain from 1 to 50 carbon atoms, more preferably from 1 to 20. R'$_3$ is preferably a branched-chain alkyl group containing from 3 to about 20 carbon atoms. Esters characterized by Formula (V), where R'$_3$ is a hydrocarbyl group, are prepared by reacting the carboxylic acid (R'$_2$COOH) or its anhydride with an alcohol R'$_3$OH wherein R'$_3$ is as defined above. Examples of useful alcohols include methyl alcohol, ethyl alcohol, amyl alcohol, octyl alcohol, isooctyl alcohol, decyl alcohol, isodecyl alcohol, tridecyl alcohol, octadecyl alcohol, etc.

The hydroxy compound reacted with the carboxylic acid or anhydride also may be characterized by the formula, HOR'$_4$CN, wherein R'$_4$ is a hydrocarbylene group. Specific examples of such hydroxy-containing compounds include 2-cyanoethanol, 2-cyano-1-propanol, etc. Examples of hydroxy compounds characterized by the formula HOR'$_4$NO$_2$ which can be reacted with the acid or anhydride compounds include 2-nitroethanol; 2-methyl-2-nitropropanol, 3-nitro-2-butanol; 2-nitro-1-propanol; 3-nitro-2-pentanol; etc. Examples of hydroxy compounds characterized by the formula HOR'$_4$CF$_3$ include 2,2,2-trifluoroethanol; 1,1,1-trifluoro-2-propanol; 2-trifluoromethyl-2-propanol; etc.

The carboxylic ester compounds useful in the present invention characterized by Formulae (IV) and (V) can be prepared by reacting a carboxylic acid (R'$_2$COOH) or its anhydride with any of the above-described hydroxy-containing compounds. Generally, about equivalent amounts of the acid or anhydride and the hydroxy-containing compounds are utilized in the reaction which is a typical esterification reaction. Although no catalyst is required for the anhydrides, the esterification reaction with carboxylic acid generally is acid catalyzed. Typically, about 1% by weight of an acid catalyst such as a mineral acid or para-toluene sulfonic acid is utilized in the reaction mixture. The mixture is heated and stirred while removing water when the free acids are used and, optionally excess carboxylic acid. The reaction may be conducted in the presence of solvent such as hydrocarbon solvents including toluene, xylene, etc.

The following examples illustrate the preparation of the carboxylic esters (C-2) useful in the present invention. Neutralization number is the amount in milligrams (mg) of potassium hydroxide (KOH) or hydrochloric acid (HCl) to neutralize one gram of sample.

EXAMPLE 9

Into a reaction vessel there are charged 244 parts of Neodol 23-6.5, and the contents of the vessel are heated to 90° C. while blowing nitrogen through the liquid. Dropwise addition of 51 parts of acetic anhydride is begun, and the addition requires about 0.5 hour. An additional 5 parts of acetic anhydride are charged to the reaction mixture and the mixture is heated to 100° C. This procedure is repeated twice and the mixture is then maintained at about 100° C. for 2 hours whereupon the mixture is stripped to 135° C. at 30 mm Hg. The residue is filtered through a mixture containing about 10 parts of diatomaceous earth and about 3 parts of calcium hydroxide. The filtrate is the desired product. The filtrate has a neutralization acid number to phenolphthalein of 2.8 mg KOH and a neutralization base number to bromophenol blue of 0.3 mg HCl.

EXAMPLE 10

A mixture of 630 parts (1 equivalent) of Alfonic 1412-60, about 75 parts (about 1.0 equivalent) of formic acid, about 50 parts of toluene and 2 parts of para-toluenesulfonic acid is prepared and heated to 110° C. with stirring. Azeotropic water is collected over 8 hours, and the reaction mixture then is stripped to 100° C. The residue is filtered, and the filtrate is the desired ester. An infrared spectrum of the filtrate shows no hydroxyl group absorbance at about 3400 cm$^{-1}$.

EXAMPLE 11

A mixture of 133 parts (0.287 mole) of Alfonic 1012-60, 20 parts (0.33 mole) of acetic acid, about 50 parts of toluene and 5 parts of an acidified clay is prepared and heated to reflux. The mixture is maintained at the reflux temperature for about 12 hours. Sulfuric acid (@ parts) is added and the reaction is carried out for an additional 8 hours while removing water. The residue is filtered, and the filtrate is stripped at reduced pressure to yield a light amber oil which is the desired product.

EXAMPLE 12

Alfonic 1412-60 (127 parts, 0.25 mole) is charged to a reaction vessel, and 53 parts (0.26 mole) of trifluoroacetic acid are then added. An exothermic reaction results which raises the temperature to about 72° C. The mixture then is heated to about 110° C. for 1 hour and stripped under vacuum at 70° C. for about 1.5 hours. The residue is the desired product.

EXAMPLE 13

A mixture of 170 parts (2 moles) of cyanoacetic acid, 400 parts (2 moles) of tridecyl alcohol and 10 parts of a sulfuric acid treated clay is prepared, and the mixture is heated to about 150° C. Water is evolved very quickly and removed. The reaction mixture is cooled to 120° C. and maintained at this temperature for 6 hours. The product, after cooling, is filtered, and the filtrate is the desired product.

EXAMPLE 14

A mixture of 577 parts (1 mole) of Sandopan DTC (carboxylic acid of the general structure R'(OCH$_2$CH$_2$)$_n$OCH$_2$COOH where R' is aliphatic and n is an integer of from 1 to about 10), 119 parts (1 mole) of 2-methyl-2-nitropropanol and 10 parts of Amberlyst 15 catalyst is prepared and the temperature of the mixture is elevated. Water is evolved and removed from the reaction mixture. Maximum reaction temperature of 140° C. is attained as the water is removed. The residue is the desired product.

EXAMPLE 15

A mixture of 516 parts (3 moles) of decanoic acid and 357 parts (3 moles) of 2-methyl-2-nitropropanol is prepared, and the mixture is heated to about 150° C. Water is removed as it evolves. When all the water is removed, the reaction mixture is filtered, and the filtrate is the desired product.

Other esters of the type represented by Formulae (IV) and (V) can be prepared by procedures similar to the procedures in Examples 3–7 involving the reaction of a carboxylic acid R'$_2$COOH and the hydroxy-containing compounds discussed above. Specific examples of acids and hydroxy-containing compounds which can be reacted to form the desired esters of this invention are illustrated in Table I.

TABLE I

| Example | R$_2$'COOH | Hydroxy Compound |
|---|---|---|
| 16 | S(CH$_2$CH$_2$C(O)—OH)$_2$ | HOCH$_2$CH$_2$CN |
| 17 | O$_2$NCH$_2$CH$_2$COOH | HOCH$_2$CF$_3$ |
| 18 | octyl(OCH$_2$CH$_2$)$_6$COOH | N(CH$_2$CH$_2$OH)$_3$ |

TABLE I-continued

| Example | R$_2$'COOH | Hydroxy Compound |
|---|---|---|
| 19 | HOCH(CH$_3$)COOH | HOCH$_2$CH$_2$NO$_2$ |
| 20 | CH$_3$OCH$_2$COOH | Neodol 23-6.5 |
| 21 | CF$_3$COOH |  |
| 22 | succinic acid | Neodol 23-6.5 |

In another embodiment, the carboxylic ester comprises (C-3) at least one carboxylic ester of a polyhydroxy compound containing at least two hydroxy groups and characterized by the general formula $$R''(O(O)CR''_1)_r \quad \text{(VI)}$$

wherein R'' is a hydrocarbyl group, each R''$_1$ is independently hydrogen, a straight chain lower hydrocarbyl group, a branched chain hydrocarbyl group, or a straight chain hydrocarbyl group containing from about 8 to about 22 carbon atoms provided that at least one R''$_1$ group is hydrogen, a lower straight chain hydrocarbyl or a branched chain hydrocarbyl group, or a carboxylic acid-or carboxylic ester-containing hydrocarbyl group, and r is at least 2.

The carboxylic ester is the reaction product of one or more carboxylic acids (or the lower esters thereof such as methyl, ethyl, etc.) with polyhydroxy compounds containing at least two hydroxy groups. The polyhydroxy compounds may be represented by the general formula R''(OH)$_r$ wherein R'' is a hydrocarbyl group and r is at least 2. The hydrocarbyl group may contain from 4 to about 50, more preferably from 4 to about 20, carbon atoms, and the hydrocarbyl group may also contain one or more nitrogen and/or oxygen atoms. The polyhydroxy compounds generally will contain from about 2 to about 10 hydroxy groups and more preferably from about 3 to about 10 hydroxyl groups. The polyhydroxy compound may contain one or more oxyalkylene groups, and, thus, the polyhydroxy compounds include compounds such as polyetherpolyols. The number of carbon atoms and number of hydroxy groups contained in the polyhydroxy compound used to form the carboxylic esters may vary over a wide range, and it is only necessary the carboxylic ester produced with the polyhydroxy compounds be soluble in the fluorine-containing hydrocarbon (A).

The polyhydroxy compounds used in the preparation of the carboxylic esters also may contain one or more nitrogen atoms. For example, the polyhydroxy compound may be an alkanol amine containing from 3 to 6 hydroxy groups. In one preferred embodiment, the polyhydroxy compound is an alkanol amine containing at least two hydroxy groups and more preferably at least three hydroxy groups.

Specific examples of polyhydroxy compounds useful in the present invention include ethylene glycol, diethylene glycol, triethylene glycol, propylene glycol, dipropylene glycol, glycerol, neopentyl glycol, 1,2-, 1,3- and 1,4-butanediols, pentaerythritol, dipentaerythritol, tripentaerythritol, triglycerol, trimethylolpropane, sorbitol, hexaglycerol, 2,2,4-trimethyl-1,3-pentanediol, etc. Mixtures of any of the above polyhydroxy compounds can be utilized.

The carboxylic acids utilized in the preparation of the carboxylic esters (C-3) of the present invention may be characterized by the following general formula $R''_1COOH$ wherein $R''_1$ is (a), H, (b), a straight chain lower hydrocarbyl group, (c) a branched chain hydrocarbyl group, or (d) a mixture of one or both of (b) and (c) with a straight chain hydrocarbyl group containing from about 8 to about 22 carbon atoms or (e) a carboxylic acid- or carboxylic acid ester-containing hydrocarbyl group. Stated otherwise, at least one $R''_1$ group in the ester of Formula (VI) must contain a lower straight chain hydrocarbyl group or a branched chain hydrocarbyl group. The straight chain lower hydrocarbyl group ($R''_1$) contains from 1 to about 7 carbon atoms, and in a preferred embodiment, contains from 1 to about 5 carbon atoms. The branched chain hydrocarbyl group may contain any number of carbon atoms and will generally contain from 4 to about 20 carbon atoms. In one preferred embodiment, the branched chain hydrocarbon group contains from 5 to 20 carbon atoms and in a more preferred embodiment, contains from about 5 to about 14 carbon atoms. The higher molecular weight straight chain hydrocarbyl group containing from 8 to about 22 carbon atoms will contain in some embodiments, from 8 to about 18 carbon atoms, and in more preferred embodiments from 8 to about 14 carbon atoms.

In one preferred embodiment, the branched chain hydrocarbyl groups are characterized by the structure $$-C(R''_2)(R''_3)(R''_4)$$

wherein $R''_2$, $R''_3$ and $R''_4$ are each independently alkyl groups, and at least one of the alkyl groups contains two or more carbon atoms. Such branched chain alkyl groups, when attached to a carboxyl group are referred to in the industry as neo groups and the acids are referred to as neo acids. In one embodiment, $R''_2$ and $R''_3$ are methyl groups and $R''_4$ is an alkyl group containing two or more carbon atoms.

Any of the above hydrocarbyl groups ($R''_1$) may contain one or more carboxy groups or carboxy ester groups such as $-COOR''_5$ wherein $R''_5$ is a lower alkyl, hydroxy alkyl or a hydroxy alkyloxy group. Such substituted hydrocarbyl groups are present, for example, when the carboxylic acid, $R''_1COOH$, is a dicarboxylic acid or a monoester of a dicarboxylic acid. Generally, however, the acid $R''COOH$ is a monocarboxylic acid since polycarboxylic acids tend to form polymeric products if the reaction conditions and amounts of reactants are not carefully regulated. Mixtures of monocarboxylic acids and minor amounts of dicarboxylic acids or anhydrides are useful in preparing the carboxylic esters.

Examples of carboxylic acids containing a straight chain lower hydrocarbyl group include formic acid, acetic acid, propionic acid, butyric acid, pentanoic acid, hexanoic acid and heptanoic acid. Examples of carboxylic acids wherein the hydrocarbyl group is a branched-chain hydrocarbyl group include 2-ethyl-n-butyric acid, 2-hexyldecanoic acid, isononanoic acid, isostearic acid, 2-methylhexanoic acid, 3,5,5-trimethylhexanoic acid, 2-ethylhexanoic acid, neoheptanoic acid, neodecanoic acid, and commercial mixtures of branched chain carboxylic acid such as a mixture of neododecanoic acid and neotetradecanoic acid having a molecular weight of approximately 206 by acid number identified as Neo 1214 acid from Exxon.

The third type of carboxylic acid which can be utilized in the preparation of the carboxylic esters are the acids containing a straight chain hydrocarbyl group containing from 8 to about 22 carbon atoms. As noted previously, these higher molecular weight straight chain acids can be utilized only in combination with one of the other acids described above since the higher molecular weight straight chain acids are not soluble in the fluorohydrocarbons. Examples of such higher molecular weight strain chain acids include decanoic acid, dodecanoic acid, stearic acid, lauric acid, behenic acid, etc. Examples of dicarboxylic acids include maleic acid, succinic acid, etc.

In another embodiment, the carboxylic acids utilized to prepare the carboxylic esters (C-3) may comprise a mixture of a major amount of monocarboxylic acids and a minor amount of dicarboxylic acids. The presence of the dicarboxylic acids results in the formation of esters of higher viscosity. The use of mixtures containing larger amounts of dicarboxylic acids should be avoided since the product ester will contain larger amounts of polymeric esters, and such mixtures may be insoluble in the fluorohydrocarbons. An example of such a mixture of 80 parts of neoheptanoic acid and 20 parts of succinic acid.

The carboxylic esters of Formula (VI) are prepared, as mentioned above, by reacting at least one carboxylic acid with at least one polyhydroxy compound containing at least two hydroxy groups. The formation of esters by the interaction of carboxylic acids and alcohols is acid catalyzed and is a reversible process which can be made to process to completion by use of a large amount of alcohol or by removal of the water as it is formed in the reaction. If the ester is formed by transesterification of a lower molecular weight carboxylic ester, the reaction can be forced to completion by removal of the low molecular weight alcohol formed as a result of a transesterification reaction. The esterification reaction can be catalyzed by either organic acids or inorganic acids. Examples of inorganic acids include sulfuric acids and acidified clays. A variety of organic acids can be utilized including para-toluenesulfonic acid, acidic resins such as Amberlyst 15, etc. Organometallic catalysts include, for example, tetraisopropoxy orthotitanate.

The amounts of carboxylic acids and polyhydroxy compounds included in the reaction mixture may be varied depending on the results desired. If it is desired to esterify all of the hydroxyl groups contained in the polyhydroxy compounds, sufficient carboxylic acid should be included in the mixture to react with all of the hydroxyl groups. When mixtures of the alcohols are reacted with a polyhydroxy compound in accordance with the present invention, the carboxylic acids can be reacted sequentially with the polyhydroxy compounds or a mixture of carboxylic acids can be prepared and the mixture reacted with the polyhydroxy compounds. In one preferred embodiment wherein mixtures of acids are utilized, the polyhydroxy compound is first reacted with one carboxylic acid, generally, the higher molecular weight branched chain or straight chain carboxylic acid followed by reaction with the straight chain lower hydrocarbyl carboxylic acid. Throughout the specification and claims, it should be understood that the esters also can be formed by reaction of the polyhydroxy compound with the anhydrides of any of the above-described carboxylic acids. For example, esters are easily prepared by reacting the polyhydroxy compounds either with acetic acid or acetic anhydride.

The formation of esters by the reaction of carboxylic acids or anhydrides with the polyhydroxy compounds described above can be effected by heating the acids or anhydrides, the polyhydroxy compounds, and an acid catalyst to an elevated temperature while removing water or low molecular weight alcohols formed in the reaction. Generally, temperatures of from about 75° C. to about 200° C. or higher are sufficient for the reaction. The reaction is completed when water or low molecular weight alcohol is no longer formed, and such completion is indicated when water or low molecular weight alcohols can no longer be removed by distillation.

In some instances, it is desired to prepare carboxylic esters wherein not all of the hydroxyl groups have been esterified. Such partial esters can be prepared by the techniques described above and by utilizing amounts of the acid or acids which are insufficient to esterify all of the hydroxy groups.

The following examples illustrate the preparation of additional carboxylic esters (C-3) which are useful in the liquid compositions of the invention.

EXAMPLE 23

A mixture of 872 parts (6.05 moles) of 2-ethylhexanoic acid, 184 parts (2 moles) of glycerol and 200 parts of toluene is prepared and blown with nitrogen while heating the mixture to about 60° C. Para-toluene sulfonic acid (5 parts) is added to the mixture which is then heated to the reflux temperature. A water/toluene azeotrope distills at about 120° C. A temperature of 125°-130° C. is maintained for about 8 hours followed by a temperature of 140° C. for 2 hours while removing water. The residue is the desired ester.

EXAMPLE 24

Into a reaction vessel there are charged 600 parts (2.5 moles) of triglycerol and 1428 parts (14 moles) of acetic anhydride. The mixture is heated to reflux in a nitrogen atmosphere and maintained at the reflux temperature (125°-130° C.) for about 9.5 hours. The reaction mixture is vacuum stripped at 150° C. and 15 mm Hg. The residue is filtered through a filter aid, and the filtrate is the desired ester.

EXAMPLE 25

A mixture of 364 parts (2 moles) of sorbitol, and 340 parts (2 moles) of a commercial $C_{8-10}$ straight chain methyl ester (Procter & Gamble), is prepared and heated to 180° C. The mixture is a two-phase system. Para-toluene sulfonic acid (1 part) is added, and the mixture is heated to 150° C. whereupon the reaction commences with water and methanol evolve. When the solution becomes homogeneous, 250 parts (2.5 moles) of acetic anhydride are added with stirring. The reaction mixture then is stripped at 150° C. and filtered. The filtrate is the desired ester of sorbitol.

EXAMPLE 26

A mixture of 402 parts (3 moles) of trimethylol propane, 660 parts (3 moles) of a commercial straight chain methyl ester comprising a mixture of about 75% $C_{12}$ methyl ester and about 25% $C_{14}$ methyl ester, (CE1270 from Procter & Gamble), and tetraisopropoxy orthotitanate is prepared and heated to 200° C. with mild nitrogen blowing. The reaction is allowed to proceed overnight at this temperature, and in 16 hours, 110 parts of methanol is collected. The reaction mixture is cooled to 150° C., and 100 parts of acetic acid and 50 parts of toluene are added followed by the addition of an additional 260 parts of acetic acid. The mixture is heated at about 150° C. for several hours yielding the desired ester.

EXAMPLE 27

A mixture of 408 parts (3 moles) of pentaerythritol and 660 parts (3 moles) of the CE1270 methyl ester used in Example 21 is prepared with 5 parts of tetraisopropyl orthotitanate, and the mixture is heated to 220° C. under a nitrogen purge. No reaction occurs. The mixture then is cooled to 130° C., and 250 parts of acetic acid are added. A small amount of para-toluenesulfonic acid is added and the mixture is stirred at about 200° C. for 2 days, and 60 parts of methanol are removed. At this time, 450 parts of acetic anhydride are added and the mixture is stirred at 150° C. until the acetic acid/water azeotrope no longer evolves. The residue is filtered through a filter aid, and the filtrate is the desired ester of pentaerythritol.

EXAMPLE 28

A mixture of 544 parts (4 moles) of pentaerythritol, 820 parts (4 moles) of Neo 1214 acid, a commercial acid mixture available from Exxon, 408 parts (4 moles) of acetic anhydride and 50 parts of Amberlyst 15 is prepared and heated to about 120° C. whereupon water and acetic acid begin to distill. After about 150 parts of water/acetic acid are collected, the reaction temperature increases to about 200° C. The mixture is maintained at this temperature for several days and striped. Acetic anhydride is added to esterify any remaining hydroxyl groups. The product is filtered and the filtrate is the desired ester.

EXAMPLE 29

A mixture of 508 parts (2 moles) of dipentaerythritol, 812 parts (8 moles) of acetic anhydride, 10 parts of acidified clay as catalyst and 100 parts of xylene is prepared and heated to 100° C. This temperature is maintained until the solid dipentaerythritol is dissolved. A water/acetic acid azeotrope is collected, and when the rate of evolution diminishes, the reaction mixture is blow with nitrogen. About 100-200 parts of acetic acid are added and the reaction is continued as additional water/acetic acid/xylene azeotrope is collected. When an infrared analysis of the reaction mixture indicates a minimum of free hydroxyl groups, the reaction mixture is stripped and filtered. The filtrate is the desired product which solidifies.

EXAMPLE 30

A mixture of 372 parts (1 mole) of tripentaerythritol, 910 parts (7 moles) of neoheptanoic acid and 30 parts of Amberlyst 15 catalyst is prepared and heated to 110° C. as water is removed. The mixture is heated for a total of 48 hours, and unreacted acid is removed by stripping the mixture. The residue is the desired ester.

EXAMPLE 31

A mixture of 1032 parts (6 moles) of neodecanoic acid and 318 parts (3 moles) of diethylene glycol is prepared and heated to 130° C. in the presence of 20 parts of Amberlyst 15. After heating for 24 hours and removing about 90 parts of water, 20 parts of Amberlyst 15 are added and the reaction is conducted for another 24 hours. The residue is the desired ester.

EXAMPLE 32

A mixture of 200 parts (2 moles) of succinic anhydride and 62 parts (1 mole) of ethylene glycol is heated to 120° C., and the mixture becomes a liquid. Five parts of acidic clay are added as catalyst, and an exotherm to about 180° C. occurs. Isooctanol (260 parts, 2 moles) is added, and the reaction mixture is maintained at 130° C. as water is removed. When the reaction mixture becomes cloudy, a small amount of propanol is added and the mixture is stirred at 100° C. overnight. The reaction mixture then is filtered to remove traces of oligomers, and the filtrate is the desired ester.

EXAMPLE 33

A mixture of 294 parts (3 moles) of maleic anhydride and 91 parts (1.5 moles) of ethylene glycol is prepared and heated at about 80° C. whereupon a strong exotherm occurs and the temperature of the mixture is raised to about 120° C. When the temperature of the mixture cools to about 100° C., 222 parts (3 moles) of n-butyl alcohol and 10 parts of Amberlyst 15 are added. Water begins to evolve and is collected. The reaction mixture is maintained at 120° C. until 50 parts of water is collected. The residue is filtered, and the filtrate is the desired product.

EXAMPLE 34

A mixture of 1072 parts (8 moles) of trimethylolpropane, 2080 parts (16 moles) of neo-heptanoic acid and 50 parts of Amberlyst 15 is prepared and heated to about 130° C. A water/acid azeotrope evolves and is removed. When about 250 parts of the azeotrope has been removed, 584 parts (4 moles) of adipic acid are added and the reaction continues to produce an additional 450 parts of distillate. At this time, 65 parts of trimethylolpropane are added to the mixture and additional water is removed. The residue is filtered and the filtrate is the desired ester.

The liquid compositions of the present invention are characterized as having improved thermal and chemical stability over a wide temperature range. Other additives, if soluble in the liquid, known to be useful for improving the properties of halogen-containing hydrocarbon refrigerants can be included in the liquid compositions of the present invention to improve the characteristics of the liquid as a refrigerant. However, hydrocarbon oils such as mineral oil generally are not included in and are most often excluded from the liquid compositions of the invention, particularly when the fluorine-containing hydrocarbon contains no other halogen.

The additives which may be included in the liquid compositions of the present invention to enhance the performance of the liquids include extreme-pressure and anti-wear agents, oxidation and thermal-stability improvers, corrosion-inhibitors, viscosity improvers, pour point and/or floc point depressants, detergents, dispersants, anti-foaming agents, viscosity adjusters, etc. As noted above, these supplementary additives must be soluble in the liquid compositions of the invention. Included among the materials which may be used as extreme-pressure and anti-wear agents are phosphates, phosphate esters, phosphites, thiophosphates such as zinc diorganodithiophosphates, dithiocarbamates, chlorinated waxes, sulfurized fats and olefins, organic lead compounds, fatty acids, molybdenum complexes, borates, halogen-substituted phosphorous compounds, sulfurized Diels Alder adducts, organic sulfides, metal salts of organic acids, etc. Sterically hindered phenols, aromatic amines, dithiophosphates, phosphites, sulfides and metal salts of dithioacids are useful examples of oxidation and thermal stability improvers. Compounds useful as corrosion-inhibitors include organic acids, organic amines, organic alcohols, metal sulfonates, organic phosphites, etc. Viscosity improvers include polyolefins such as polybutene, polymethacrylates, etc. Pour point and floc point depressants include polymethacrylates, ethylene-vinyl acetate copolymers, maleamic acid-olefin copolymers, ethylene-alpha-olefin copolymers, etc. Detergents include sulfonates, long-chain alkyl-substituted aromatic sulfonic acids, phosphonates, phenylates, metal salts of alkyl phenols, alkyl phenolaldehyde condensation products, metal salts of substituted salicylates, etc. Silicone polymers are a well known type of anti-foam agent. Viscosity adjusters are exemplified by polyisobutylene, polymethacrylates, polyalkyl styrenes, naphthenic oils, alkyl benzene oils, polyesters, polyvinyl chloride, polyphosphates, etc.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

The liquid compositions of the present invention are particularly useful as refrigerants in various refrigeration systems which are compression-type systems such as refrigerators, freezers, and air-conditioners including automotive, home and industrial air-conditioners. The following examples are illustrative of the liquid compositions of the present invention.

|  | Parts by Wt. |
|---|---|
| Example A | |
| 1,1,1,2-tetrafluoroethane (HCFC-134a) | 90 |
| Product of Example 2 | 10 |
| Example B | |
| 1,1,2,2-tetrafluoroethane | 85 |
| Product of Example 5 | 15 |
| Example C | |
| HCFC-134a | 95 |
| Product of Example 5 | 5 |
| Example D | |
| HCFC-134a | 80 |
| Product of Example 7 | 20 |
| Example E | |
| HCFC-134a | 85 |
| Product of Example 8 | 15 |
| Example F | |
| HCFC-134a | 75 |
| Product of Example 2 | 5 |
| Polyoxypropylene glycol* | 20 |
| Example G | |
| HCFC-134a | 80 |
| Product of Example 5 | 10 |
| Product of Example 23 | 10 |
| Example H | |
| HCFC-134a | 80 |
| Product of Example 7 | 5 |
| Product of Example 10 | 7.5 |
| Polyoxypropylene glycol* | 7.5 |

*NIAX-425 Available from Union Carbide

We claim:
1. A liquid compositions comprising:
   (A) a major amount of at least one fluorine-containing hydrocarbon containing one or two carbon atoms;
   (B) a minor amount of at least one soluble organic lubricant comprising at least one organic thiocarbamate characterized by the formulae

$$R_1R_2NC(X)SC(R_3R_4)C(H)(R_5)\,_aZ, \text{ or} \qquad (I)$$

$$R_1R_2NC(X)SC(R_3R_4)C(H)(R_5)\,_aC(X)A\,_2Z' \qquad (II)$$

wherein
   $R_1$ and $R_2$ are each independently lower alkyl, aryl, aralkyl or together form a heterocyclic group in which the ring is completed through the nitrogen;
   X is O or S;
   A is O, S or NR;
   R is H or a lower alkyl group;
   $R_3$, $R_4$ and $R_5$ are each independently H, lower alkyl or aryl groups;
   a is 0 or 1;
   Z is —CN, —S(O)$R_6$, —S(O)O$R_6$, —S(O)$_2R_6$, —S(O)$_2R_6$, or —C(O)Y;
   $R_6$ is —H, alkyl or aralkyl;
   Y is —H, —OH, —$R_7$, —O$R_7$, —O$R_8$OH, or —N$R_9R_{10}$;
   $R_7$ is an alkyl, aryl or aralkyl group;
   $R_8$ is an alkylene group of 1 to about 7 carbon atoms;
   $R_9$ and $R_{10}$ are each independently —H, alkyl, hydroxyalkyl, cycloaliphatic, or together form cyclic group in which the ring is completed through the nitrogen atom; and
   Z' is —$R_8$— or —$R_8$—A—$R_8$—; and
   (C) at least one polyoxyalkylene glycol or at least one carboxylic ester.

2. The liquid composition of claim 1 wherein fluorine is the only halogen in the fluorine-containing hydrocarbon (A).

3. The liquid composition of claim 1 wherein the fluorine-containing hydrocarbon (A) is 1,1,1,2-tetrafluoroethane.

4. The liquid composition of claim 1 comprising from about 70% to about 99% by weight of the fluorine-containing hydrocarbon (A) and from about 0.1 to about 30% by weight of the soluble organic lubricant (B).

5. The liquid composition of claim 1 wherein Z in Formula I is —COO$R_7$, wherein $R_7$ is an alkyl, or —COO$R_8$OH, wherein $R_8$ is an alkylene group containing from 1 to about 7 carbon atoms.

6. The liquid composition of claim 1 wherein X in Formula I is S.

7. The liquid composition of claim 1 wherein a is 1 and $R_3$, $R_4$ and $R_5$ are hydrogen in Formulae I and II.

8. The liquid composition of claim 1 wherein a is 0 and $R_3$ and $R_4$ are hydrogen in Formula I.

9. The liquid composition of claim 1 wherein $R_1$ and $R_2$ in Formula I are lower alkyl groups.

10. The liquid composition of claim 1 wherein the lubricant is characterized by Formula II, and Z' is —$R_8$—.

11. The liquid composition of claim 1 wherein the lubricant is characterized by Formula II, and each X is S and Z' is —$R_8$—.

12. A liquid composition comprising:
    (A) from about 70% to about 99% by weight of at least one fluorine-containing hydrocarbon containing 1 or 2 carbon atoms;
    (B) a minor amount of at least one soluble organic lubricant comprising at least one organic thiocarbamate characterized by the formula $$R_1R_2NC(X)SC(R_3R_4)C(H)(R_5)C(O)Y \qquad (IA)$$

wherein
    $R_1$ and $R_2$ are each independently lower alkyl groups or together form a heterocyclic group in which the ring is completed through the nitrogen;
    X is O or S;
    $R_3$, $R_4$ and $R_5$ are each independently —H or lower alkyl groups;
    Y is —H, —OH, —$R_7$, —O$R_7$, —O$R_8$OH, or —N$R_9R_{10}$;
    $R_7$ is a lower alkyl group;
    $R_8$ is an alkylene group of 1 to about 7 carbon atoms; and
    $R_9$ and $R_{10}$ are each independently —H, alkyl, hydroxyalkyl, cycloaliphatic, or together form a cyclic group in which the ring is completed through the nitrogen atom; and
    (C) at least one polyoxyalkylene glycol or at least one carboxylic ester.

13. The liquid composition of claim 12 wherein fluorine is the only halogen in the fluorine-containing hydrocarbon (A).

14. The liquid composition of claim 12 wherein the fluorine-containing hydrocarbon (A) is 1,1,1,2-tetrafluoroethane.

15. The liquid composition of claim 12 wherein X is sulfur.

16. The liquid composition of claim 12 wherein $R_1$ and $R_2$ in Formula IA are lower alkyl groups.

17. The liquid composition of claim 12 wherein $R_3$ and $R_4$ are hydrogen and $R_5$ is hydrogen or a lower alkyl group.

18. The liquid composition of claim 12 wherein Y is —O$R_7$ or —O$R_8$OH wherein $R_7$ is a lower alkyl group and $R_8$ is an alkylene group containing from 1 to about 7 carbon atoms.

19. The liquid composition of claim 12 wherein $R_1$ and $R_2$ are lower alkyl groups, X is sulfur, $R_3$ and $R_4$ are hydrogen and $R_5$ is hydrogen or a lower alkyl group.

20. A liquid composition comprising:
    (A) from about 70% to about 99% by weight of at least one fluorine-containing hydrocarbon containing 1 or 2 carbon atoms and wherein fluorine is the only halogen present;
    (B) from about 0.1% to about 30% by weight of at least one soluble organic lubricant comprising at least one organic dithiocarbamate characterized by the formula $$R_1R_2NC(S)SC(R_3)(R_4)C(H)(R_5)C(O)Y \qquad (IB)$$

wherein
    $R_1$ and $R_2$ are each independently lower alkyl groups;
    $R_3$, $R_4$ and $R_5$ are each independently H or lower alkyl groups;
    Y is —O$R_7$, —O$R_8$OH, or —N$R_9R_{10}$;

R$_7$, R$_9$ and R$_{10}$ are each independently lower alkyl or hydroxyalkyl groups; and R$_8$ is an alkylene group of 1 to about 7 carbon atoms; and (C) at least one polyoxyalkylene glycol or at least one carboxylic ester.

21. The liquid composition of claim 20 wherein the fluorine-containing hydrocarbon (A) is 1,1,1,2-tetrafluoroethane.

22. The liquid composition of claim 20 wherein R$_3$ and R$_4$ are hydrogen and R$_5$ is hydrogen or a lower alkyl group.

23. The liquid composition of claim 20 wherein Y is —OR$_7$ or —OR$_8$OH wherein R$_7$ is a lower alkyl group and R$_8$ is an alkylene group containing from 1 to about 7 carbon atoms.

24. A liquid composition comprising:
(A) a major amount of at least one fluorine-containing hydrocarbon containing 1 or 2 carbon atoms;
(B) a minor amount of at least one soluble organic lubricant comprising at least one organic thiocarbamate derived from reactants which comprise
(1) CS$_2$, COS or a source material therefor;
(2) an amine of the formula $$R_1R_2NH \qquad (III)$$

wherein R$_1$ and R$_2$ are each independently lower alkyl, aryl, aralkyl or together form a heterocyclic group in which the ring is completed through the nitrogen; and (3) a reactant selected from reactants having the formulae $$R_3R_4C=C(R_5)Z \qquad (IV)$$

or $$R_3R_4C(X')Z \qquad (V)$$

or $$(R_3R_4C=C(R_5)C(X)A)_2Z' \qquad (VI)$$

or $$(R_3R_4C(X')C(X)A)_2Z' \qquad (VII)$$

wherein
R$_3$, R$_4$ and R$_5$ are each independently H or lower alkyl groups;
X' is a halogen;

X is O or S;
A is O, S, or —NR;
R is —H or a lower alkyl;
Z is —CN, —S(O)R$_6$, —S(O)OR$_6$, —S(O)$_2$R$_6$, —S(O)$_2$OR$_6$, or —C(O)Y;
R$_6$ is —H or a lower alkyl;
Y is —H, —OH, —R$_7$, —OR$_7$, —OR$_8$OH, or —NR$_9$R$_{10}$;
R$_7$ is a lower alkyl group;
R$_8$ is an alkylene group containing 1 to about 7 carbon atoms;
R$_9$ and R$_{10}$ are each independently —H, lower alkyl, lower hydroxyalkyl, cycloaliphatic, or together form a heterocyclic group in which the ring is completed through the nitrogen atom;
Z' is —R$_8$— or —R$_8$—A—R$_8$—, and provided further that when reactant (3) is characterized by Formula V, the reaction is conducted in the presence of (4) a sufficient amount of at least one basic material to neutralize the HX' acid formed; and (C) at least one polyoxyalkylene glycol or at least one carboxylic ester.

25. The liquid composition of claim 1 wherein the polyoxyalkylene glycol is a polyoxyethylene glycol or polyoxypropylene glycol.

26. The liquid composition of claim 1 wherein (C) is a a polyoxyalkylene glycol having a viscosity of about 25 to 150 centistokes at 37° C. and a viscosity index of at least 20.

27. The liquid composition of claim 1 wherein (C) is a carboxylic ester represented by the formula $$R'O(R'_1O)_qC(O)R'_2 \qquad (IV)$$

or $$R'_3OC(O)R'_2 \qquad (V)$$

wherein
R' is a hydrocarbyl group of at least 2 carbon atoms,
R'$_1$ is a hydrocarbylene group,
R'$_2$ is —H, hydrocarbyl, —CF$_3$, —R'$_4$CN, —R'$_4$—NO$_2$, or —R'$_5$OCH(R'$_6$)—,
R'$_3$ is a —R'$_4$CF$_3$, —R'$_4$CN or —R'$_4$NO$_2$ group, provided that R'$_3$ may be a hydrocarbyl group when R'$_2$ is —R'$_4$CN,
q is an integer from 1 to about 50,
R'$_4$ is a hydrocarbylene group,
R'$_5$ is H, a lower hydrocarbyl group or R'$_7$C(O)— where R'$_7$ is a hydrocarbyl group, and
R'$_6$ is H or a lower hydrocarbyl group.

* * * * *